United States Patent [19]

Lazzarotto

[11] 4,116,838

[45] Sep. 26, 1978

[54] SLUDGE FILTER

[76] Inventor: Thomas Frank Lazzarotto, 320 N. Harding Ave., Chicago, Ill. 60624

[21] Appl. No.: 819,292

[22] Filed: Jul. 27, 1977

[51] Int. Cl.² ............................................. B01D 29/14
[52] U.S. Cl. .............................. 210/209; 210/333 R; 210/346; 210/486
[58] Field of Search ................ 210/209, 333 R, 340, 210/341, 346, 484, 486

[56] References Cited

U.S. PATENT DOCUMENTS

| | | | |
|---|---|---|---|
| 449,271 | 3/1891 | Proks | 210/346 X |
| 904,649 | 11/1908 | Ruff | 210/350 |
| 1,536,912 | 5/1925 | Nugent | 210/184 |
| 1,750,935 | 3/1930 | Maunula et al. | 210/302 |
| 1,767,856 | 6/1930 | Nugent | 210/87 |
| 2,401,039 | 5/1946 | Bauer | 210/184 |
| 2,819,800 | 1/1958 | Goodloe | 210/497 |
| 2,878,941 | 3/1959 | Johnson | 210/346 |
| 3,034,652 | 5/1962 | Hobson, Jr. | 210/232 |
| 3,200,949 | 8/1965 | Aulich et al. | 210/205 |
| 3,249,228 | 5/1966 | Arvanitakis | 210/184 |
| 3,325,008 | 6/1967 | Lancy | 210/73 R |
| 3,481,479 | 12/1969 | Hoskins et al. | 210/484 |
| 3,659,718 | 5/1972 | Brociner et al. | 210/333 |

OTHER PUBLICATIONS

Upgrading Metal Finishing Facilities to Reduce Pollution, U.S. E.P.A., 1973, pp. 27–47.

Primary Examiner—William A. Cuchlinski, Jr.
Attorney, Agent, or Firm—Olson, Trexler, Wolters, Bushnell & Fosse, Ltd.

[57] ABSTRACT

A sludge filter is disclosed of the type having an open-topped tank adapted to receive a quantity of sludge, and one or more filter panels vertically disposed within the tank. A hose connection extends between each panel interior and the tank exterior to draw filtrate from the panel interiors to sewer or other discharge lines. The panels comprise hollow, flexible, bi-walled, slick-sided, artificial cloth filter bags carried over open frameworks of appropriate size. The frameworks each include a top frame member having a length sufficient to extend over the tank sides and thus support the depending framework and bag within the tank.

15 Claims, 6 Drawing Figures

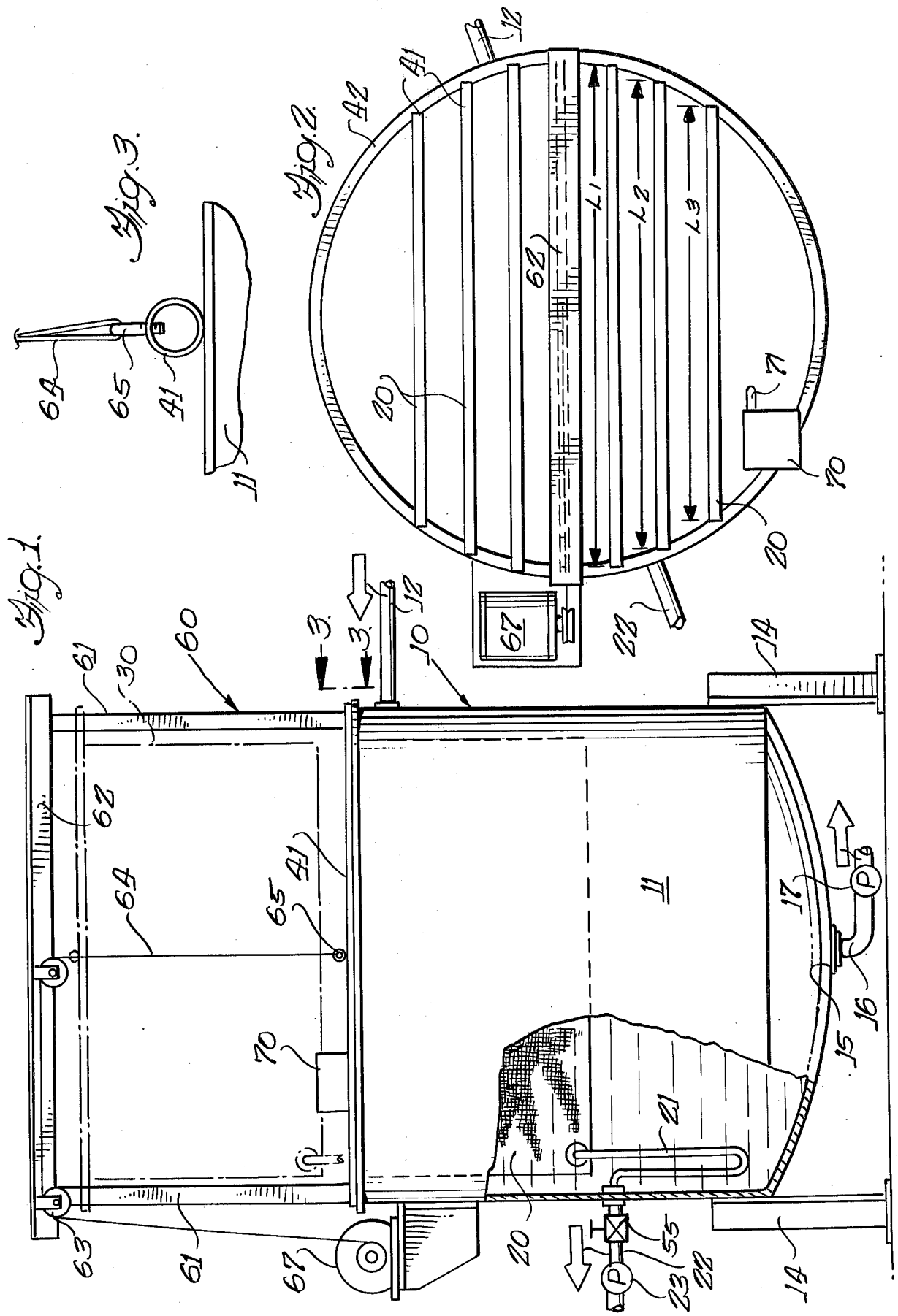

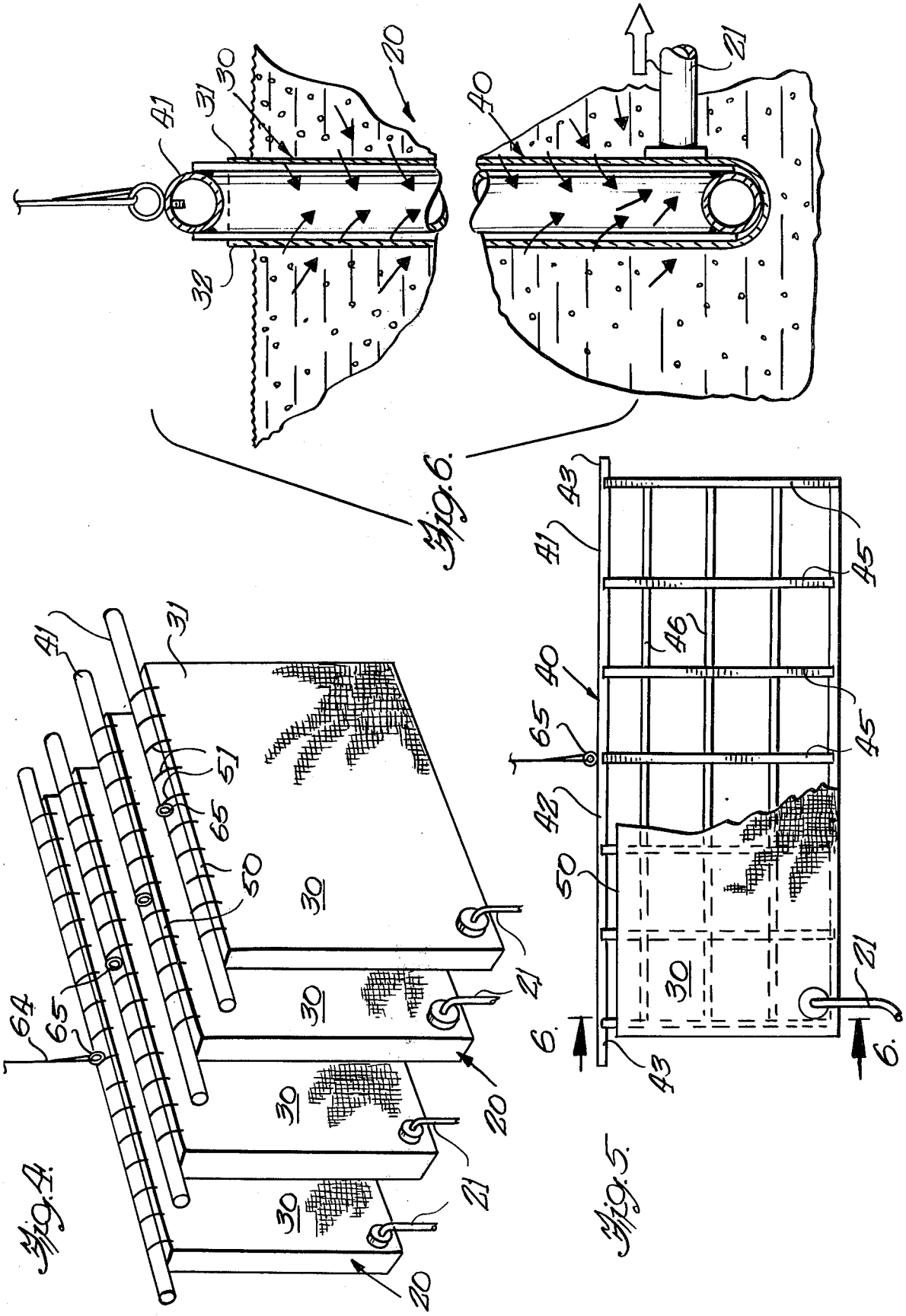

SLUDGE FILTER

BACKGROUND OF THE INVENTION

This invention relates generally to filters, and more particularly concerns a high-volume filter for industrial sludge and the like.

In metal plating and similar operations, large amounts of process water must be discharged to sewers. This water contains much dissolved metallic salts, colloidally suspended rust, dirt, and other corruption. Modern high-volume metal treating operations can develop waste water sludges containing many hundreds of tons of such material in just a short time. So much such material can be present in the water that the discharge takes the consistency of a thin mud.

Environmental protection rules now prohibit or severely restrict discharges of this type in many areas. It is therefore necessary to filter large amounts of process water inexpensively just prior to discharge. Unless very large holding tanks or basins can be installed, this water must be filtered and discharged at a comparatively rapid rate.

A number of filter-type devices have been suggested to handle this material. A brief description of one such device, called a Lancy sludge filter tank, is found at page 40 in a book entitled *Upgrading Metal Finishing Facilities to Reduce Pollution,* published by the U.S. Environmental Protection Agency in 1973. In general, this Lancy sludge filter tank includes a tank in which are disposed one or more vertically elongated sludge filter decant panels. A hose communicates with the filter decant panel interior and tank exterior. After water seeps through the filter decant panel, water collects in the panel bottom and is drawn off through the hose for pH neutralization and ultimate discharge to a sewer.

Use of the Lancy sludge filter tank and like devices have presented a number of problems to at least some users.

The filters are comparatively expensive in initial purchase price and in installation costs. The decant panels comprise relatively large, expensive sheets of a felt-like polypropylene material which are separated, in the panel interior, by an expensive honeycomb structure. The honeycomb structure and filter panels are mounted on relatively heavy frames.

In operation, it has been found that after a short period of use, the outer panel pores become so clogged with sludge material that filtering action and filtered water discharge slow to a mere trickle. To clean the filter, the clogging sludge must be manually scraped from the panels. While this scraping is going on, the entire filter system must be removed from use. Removing the filter from use requires that other plant operations be halted, or that the developing sludge material be stored in large holding basins. Extensive costs are thus incurred. In addition, the heavy Lancy panels are continuously supported from overhead superstructure. This superstructure is an additional item of initial cost.

It is accordingly the general object of the present invention to provide a more effective, efficient, and lower-cost sludge filter.

A more specific object is to provide a vertical walled panel filter system which can process large amounts of industrial sludge at a faster rate than has been possible with preceding systems.

Another object is to provide such a filter in which the filtered sludge does not easily clog the filter.

A further object is to provide a filter of the type described and which is easy to maintain. A correlated object is to provide such a filter in which the filter members can be replaced or repaired quickly, and at low cost.

Another object is to provide such a filter which can be cleaned in place in minimal time.

A still further object is to provide such a filter which can be manufactured and inexpensively and offered at an attractively low price.

Yet another object is to provide such a filter which is reliable and rugged in use, and which will provide the user with a long service life.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is an elevational view of a sludge filter embodying the present invention;

FIG. 2 is a top plan view of the sludge filter shown in FIG. 1;

FIG. 3 is a fragmentary developmental view taken substantially in the plane of line 3—3 in FIG. 1;

FIG. 4 is a perspective view showing in further detail the sludge filter panel bag elements;

FIG. 5 is an elevational view of the filter bag elements showing, in cut-away format, a bag-supporting framework; and FIG. 6 is a sectional view taken substantially in the plane of line 6—6 in FIG. 5.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention.

Turning first to FIG. 1, there is shown a sludge filter 10. In general, this sludge filter can be considered to include an open topped tank 11 which is adapted to receive a quantity of sludge from an inflow pipe 12. To accommodate the large amounts of sludge which must be processed from modern plating and similar metal-treating operations, this tank can be on the order of twelve feet deep and ten feet in diameter. The weight of the filter tank 11 and other parts are here supported upon stanchions 14. At the tank bottom 15, and effluent pipe 16 is connected to a sludge pump 17 for drawing off filtered, heavy, solid sludge material. Within the tank 11 in generally parallel array are a number of vertical-sided filter panels 20.

It will be understood that, in general, the filter operates by receiving the sludge inflow from the pipe 12. This inflow falls into the tank at a point located outside any of the filter panels 20. The water seeps through the vertical panel sides and into the panel interiors. Water collecting within the panel interiors is drawn away by filtrate hoses 21 which communicate with each panel interior and the tank exterior, as shown in FIG. 1. Preferably, these hoses 21 are connected to a filtrate pipe 22 and a filtrate pump 23 to encourage rapid filtrate discharge. If desired, this filtrate discharge can be directed to other treating apparatus for altering filtrate pH. Alternatively, the filtrate can be directly discharged to appropriate sewer or other lines.

In accordance with the invention, the filter panels 20 are of low initial cost, are easy to maintain, and provide a rapid yet effective filtering action. To this end, the filter panels 20 each include an outer filtering membrane comprising a hollow, flexible, slick-sided, artificial cloth filter panel bag 30. It has been found that bags which are flexible, and which provide relatively slick outer surfaces cause the solid materials accumulating on the outer vertical bag walls 31 and 32 to agglomerate, occassionally into sheets, to peel away from the bag walls 31 and 32, and to fall to the bottom of the tank 11. This peeling, sliding, falling action of the solids tends to remove particles which might otherwise stick within the bag pores and clog the bag. Under these circumstances, little if any manual cleaning of the bag outer surfaces 31 and 32 is required, and back-flushing or other filter-element-cleaning operations often need not be used. Industrial-thickness, industrial-strength Nylon, Dacron, Orlon, and Dextron brand cloth materials have been found highly effective for this purpose. These cloth materials can be obtained from Anode Products Company, 2559 N. Monitor, Chicago, Ill.

In a tank of the size described above, a total of seven filter elements 30 have been found to provide excellent, quick filtering action, since relatively unobstructed fluid flow can occur within the tank around the outer sides of the filter elements 30, yet the filter elements can be large enough to provide an unobstructed interior space to permit rapid removal of filtrate.

If effective filtering action is to take place, space must be provided within the bag 30 into which the filtrate water can bleed, fall and collect. The bags 30 also must be provided with a definite, reasonably rigid shape in order to present the vertical filtering sides 31 and 32 to the sludge material to be filtered. Moreover, the bags must be maintained in a relatively submerged condition. To this end, a filter panel framework 40 supports the bag 30 at spaced-apart locations as illustrated particularly in FIGS. 5 and 6.

In further accordance with the invention, the bagsupporting arrangement can be provided at low cost, yet it can be sturdy and highly effective. Here, the framework 40 includes a top frame member 41 having a length sufficient to extend over the tank top 42 (FIG. 2). It will be understood that, as the various filters 30 are located at various chordal positions within the tank 11, these pipes 41 and the lengths $L_1$, $L_2$, $L_3$, etc., of the bags 30 will be of different overall dimensions. The pipes 41 are selected so as to provide sufficient strength to support the weight of the framework elements described below, any filtrate within the filter panel, any material adhering to the panel outside, and at least part of the weight of the hose 21.

To permit the frame top members 41 to be easily adjusted so as to fit within the tank and rest upon the tank top, each framework top member 41 here includes a hollow central member 42. Telescopically fitted within this central member 42 are extension members 43. By adjusting the positions of these extension elements 43, the effective length of the top member 41 can be adjusted.

In carrying out the invention, the framework 40 closely contacts the bag filter element 30 only at spaced apart locations, so as to provide only minimal obstruction to the filtering action. A large unobstructed space is provided within the bag 30 so as to permit quick collection of filtrate. To this end, a plurality of strut members 45 depend from the top member 41 at spaced apart locations as illustrated in FIG. 5. Horizontal struts 46 provide added filter element rigidity. Together, these vertical struts 45 and the horizontal struts 46 support the bag 30 against the pressure of sludge outside the bag, and permit the bag to maintain its open interior condition so as to permit filtrate to penetrate the bag cloth, fall to the bag bottom and be drawn off by the filter hose 21. The strut members 45 and 46 are affixed, in pairs, at diametrically opposite sides of the top frame member 41, as shown in FIG. 6 so as to decrease frame weight and increase frame flexibility while providing the necessary, unobstructed bag interior space illustrated.

In accordance with another aspect of the invention, these bag elements 30 can be quickly removed and replaced should they become torn or so clogged with solid material as to decrease their filtering effectiveness to an unacceptably low level. To this end, each bag 30 is formed with an open top 50, which permits the bag 30 to be easily and quickly slipped on and off over the framework 40. At the bag top 50, a number of string-like tie members 51 are provided to be tied over the top frame member 41 so as to secure the bag 30 on the framework 40.

In further accordance with the invention, the filter bags 30 can be cleaned in place within the tank 11. To accomplish this, the tank is filled with sludge, and filtering action allowed to occur. However, a shut-off valve 55 located in the effluent line 22 is closed, and the filtrate is allowed to accumulate in the bag interiors. When the bags are filled, sludge can be temporarily drained through the pipe 16. Water within the panel bags 30 then bleeds back into the tank 11. This back-flushing action quickly and inexpensively cleans the filter bags.

To remove the filter panels 20 for maintainence, or to manually clean the interior of the tank 11, or for other reasons, the filter panels 20 can be hoisted out of the tank 11. Here, a relatively lightweight, inexpensive, permanently attached overhead hoist 60 is affixed to the top of the tank 11. This hoist 60 includes vertical members 61 which support a horizontal beam 62; to the beam 62, a system of pulleys 63 are secured. A hoist cable 64 can be connected to hoist rings 65 provided atop each framework top member 41. When the cable 64 is attached to a given filter panel hoist ring 65, a cable winch 67 can be operated to raise or lower the filter panel 20.

In use, faster, more effective filtering action can be provided by introducing an agglomerate-producing chemical into the tank 11. This chemical will react with the solids within the sludge, and will cause the solid particles in the sludge to agglomerate into particles having a size too large to pass through the pores of the bag 30. As these particles increase in size, their tendency to peel away from the bag sides 31 and 32 and to fall to the bottom of the tank 11 increases. If desired, a bleed tank 70 can conveniently be mounted atop the main filter tank 11. A small drip nozzle 71 can be sized to introduce, over a given time of extended duration, a measured amount of the agglomerate-producing chemical into the tank at a point within the tank, yet outside each filter panel 20. One chemical which has been found effective in causing agglomeration of chromic, ferric, and copper solutions is sodium tetrasulfide.

The invention is claimed as follows:

1. In a sludge filter comprising an open topped tank adapted to receive a quantity of sludge, a filter panel disposed within the tank, and a hose connection extending between the panel interior and the tank exterior to draw filtrate from the sludge filter tank, the improvement comprising a hollow, flexible, bi-walled, slick-sided, artificial cloth filter panel bag, and an open filter panel framework for supporting the bag at spaced-apart locations within the bag, the framework including a top frame member having a length sufficient to extend over the tank sides, and a strength sufficient to support the weight of the framework itself, the filter panel, any filtrate inside the panel, any material adhering to the panel outside, and at least part of the hose weight, the framework further including an open lattice of strut members depending from the top frame member at spaced apart locations, and fitting inside the cloth filter bag to maintain the bag walls in spaced-apart conditions against the pressure of sludge and water outside the bag and to permit filtrate to penetrate the bag cloth, fall to the bag bottom, and be drawn off by the filter hose.

2. The improvement according to claim 1 wherein said bag is formed of a Dacron brand artificial cloth.

3. The improvement according to claim 1 wherein said bag is formed of an Orlon brand artificial cloth.

4. The improvement according to claim 1 wherein said bag is formed of a Nylon brand artificial cloth.

5. The improvement according to claim 1 in which the bag is formed of a Dextron brand artificial cloth.

6. The improvement according to claim 1 wherein said bag is formed with an open top to permit easy assembly over the framework struts, the gab including string-like tie members at the bag top, the tie members being adapted to be tied over the top frame member to secure the bag on the framework.

7. The improvement according to claim 1 wherein said framework top member includes a central pipe member and extension members fitted for telescopic motion into and out of the central member for increasing or decreasing the top member effective length.

8. The improvement according to claim 1 wherein said strut members are affixed, in pairs, at diametrically opposite sides of said top frame member to decrease frame weight and increase frame flexibility.

9. The improvement according to claim 1 further comprising an agglomerate-producing chemical present inside the tank for causing the solid particles in the sludge to agglomerate into particles having a size too large to pass through the bag pores.

10. The improvement according to claim 1 including agglomerate bleed means for introducing, over a given time of extended duration, a measured amount of an agglomerate-producing chemical, the bleed means having drip means located at a point inside the tank and outside any bag filter panel in the tank.

11. The improvement according to claim 1 wherein the tank hose is connected to an effluent pipe, and wherein the improvement further comprises a shut-off valve in said effluent pipe to permit bag back-flushing.

12. The improvement according to claim 11 including a plurality of said frameworks and covering bags carried within said tank to maximize the filter element area presented to the sludge and consequently minimize the time required to filter a tank full of sludge.

13. The improvement according to claim 11 wherein the tank hose is connected to an effluent pipe, and wherein the improvement further comprises a shut-off valve in said effluent pipe to permit bag back-flushing.

14. In a sludge filter, comprising, an open topped tank adapted to receive a quantity of sludge, a filter panel disposed within the tank, and a hose connection extending between the panel interior and the tank exterior to draw filtrate from the sludge filter, the improvement comprising a hollow, flexible, slick-sided, artificial cloth filter panel bag, and an open filter panel framework for supporting the bag at spaced apart locations within the bag, the framework including a top frame member for supporting the bag and framework within the tank, and an open lattice of strut members depending from the top frame member at spaced apart locations and fitting inside the cloth filter bag to maintain the bag walls in spaced apart condition against the pressure of sludge outside the bag and to permit filtrate to penetrate the bag cloth, the bag being formed with an open top to permit easy bag assembly over the framework struts and including means for attaching the bag to the framework.

15. The improvement according to claim 14 including seven filter panels carried within said tank to permit relatively unobstructed fluid flow in said tank and both inside and outside said filter panels.

* * * * *